(12) United States Patent
Moniz et al.

(10) Patent No.: US 7,195,447 B2
(45) Date of Patent: Mar. 27, 2007

(54) GAS TURBINE ENGINE AND METHOD OF ASSEMBLING SAME

(75) Inventors: Thomas Ory Moniz, Loveland, OH (US); Robert Joseph Orlando, West Chester, OH (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 10/976,495

(22) Filed: Oct. 29, 2004

(65) Prior Publication Data

US 2006/0093465 A1    May 4, 2006

(51) Int. Cl.
*F01D 1/24* (2006.01)
(52) U.S. Cl. .......................... 415/69; 415/66; 60/39.162
(58) Field of Classification Search ................ 415/65, 415/66, 67, 68, 69; 60/268, 39.162
See application file for complete search history.

(56) References Cited

U.S. PATENT DOCUMENTS

| | | | |
|---|---|---|---|
| 2,829,014 A | | 4/1958 | May |
| 3,261,587 A | | 7/1966 | Rowley |
| 4,979,872 A | | 12/1990 | Myers et al. |
| 5,307,622 A | * | 5/1994 | Ciokajlo et al. ......... 60/39.162 |
| 5,443,590 A | * | 8/1995 | Ciokajlo et al. ............ 416/128 |
| 5,806,303 A | | 9/1998 | Johnson |
| 5,809,772 A | | 9/1998 | Giffin III, et al. |
| 5,813,214 A | | 9/1998 | Moniz et al. |
| 5,867,980 A | | 2/1999 | Bartos |
| 6,619,030 B1 | | 9/2003 | Seda et al. |
| 6,684,626 B1 | | 2/2004 | Orlando et al. |
| 6,711,887 B2 | | 3/2004 | Orlando et al. |
| 6,732,502 B2 | | 5/2004 | Seda et al. |
| 6,739,120 B2 | | 5/2004 | Moniz et al. |
| 6,763,652 B2 | | 7/2004 | Baughman et al. |
| 6,763,653 B2 | | 7/2004 | Orlando et al. |
| 6,763,654 B2 | | 7/2004 | Orlando et al. |

FOREIGN PATENT DOCUMENTS

| | | |
|---|---|---|
| EP | 1340902 A2 | 9/2003 |
| GB | 789958 | 1/1958 |
| GB | 2112084 A | 7/1983 |

OTHER PUBLICATIONS

International Search Report; Reference 138203/11062; Application No./Patent No. 05256517.3-2315; Place of Search Munich; Dated Mar. 27, 2006; 7 pages.

* cited by examiner

*Primary Examiner*—Hoang Nguyen
(74) *Attorney, Agent, or Firm*—William Scott Andes; Armstrong Teasdale LLP

(57) ABSTRACT

A method for assembling a gas turbine engine that includes providing a low-pressure turbine inner rotor that includes a first plurality of turbine blade rows configured to rotate in a first direction, providing a low-pressure turbine outer rotor that includes a second plurality of turbine blade rows configured to rotate in a second direction that is opposite the first direction, coupling a turbine mid-frame assembly including a plurality of spokes within the engine such that the spokes are spaced axially forward of the inner rotor, coupling a bearing between the turbine mid-frame assembly and the inner rotor such that the inner rotor is rotatably coupled to the turbine mid-frame, and adjusting the plurality of spokes to align the bearing in a radial direction.

14 Claims, 3 Drawing Sheets

GAS TURBINE ENGINE AND METHOD OF ASSEMBLING SAME

BACKGROUND OF THE INVENTION

This invention relates generally to aircraft gas turbine engines, and more specifically to a gas turbine engine and a method of assembling same.

At least one known gas turbine engine includes, in serial flow arrangement, a forward fan assembly, an aft fan assembly, a high-pressure compressor for compressing air flowing through the engine, a combustor for mixing fuel with the compressed air such that the mixture may be ignited, and a high-pressure turbine. The high-pressure compressor, combustor and high-pressure turbine are sometimes collectively referred to as the core engine. In operation, the core engine generates combustion gases which are discharged downstream to a counter-rotating low-pressure turbine that extracts energy therefrom for powering the forward and aft fan assemblies. Within at least some known gas turbine engines, at least one turbine rotates in an opposite direction than the other rotating components within the engine At least one known counter-rotating low-pressure turbine has an inlet radius that is larger than a radius of the high-pressure turbine discharge. The increased inlet radius accommodates additional rotor stages within the low-pressure turbine. Specifically, at least one known counter-rotating low-pressure turbine includes an outer rotor having a first quantity of stages that are rotatably coupled to the forward fan assembly, and an inner rotor having an equal number of stages that is rotatably coupled to the aft fan assembly.

During engine assembly, such known gas turbine engines are assembled such that the outer rotor is cantilevered from the turbine rear-frame. More specifically, the first quantity of rows stages are each coupled together and to the rotating casing to form the outer rotor. The outer rotor is then coupled to the turbine rear-frame using only the last stage of the outer rotor, such that only the last stage of the outer rotor supports the combined weight of the outer rotor and the rotating casing. The inner rotor is coupled to a shaft to facilitate driving at least one fan assembly. Moreover, the inner rotor is rotatably coupled to a turbine mid-frame using at least one bearing. Accordingly, the bearing must be properly aligned with respect to the turbine mid-frame to properly position the inner rotor within the gas turbine. However, properly positioning the bearing within the gas turbine engine results in an increased time required to assemble the gas turbine engine. Moreover, during engine operation, thermal expansion of the engine may result in a misalignment of the bearing with respect to the gas turbine engine outer casing.

BRIEF DESCRIPTION OF THE INVENTION

In one aspect, a method for assembling a gas turbine engine is provided. The method includes providing a low-pressure turbine inner rotor that includes a first plurality of turbine blade rows configured to rotate in a first direction, providing a low-pressure turbine outer rotor that includes a second plurality of turbine blade rows configured to rotate in a second direction that is opposite the first direction, coupling a turbine mid-frame assembly including a plurality of spokes within the engine such that the spokes are spaced axially forward of the inner rotor, coupling a bearing between the turbine mid-frame assembly and the inner rotor such that the inner rotor is rotatably coupled to the turbine mid-frame, and adjusting the plurality of spokes to align the bearing in a radial direction.

In another aspect, a low-pressure turbine is provided. The low-pressure turbine includes an inner rotor including a first plurality of turbine blade rows configured to rotate in a first direction, an outer rotor including a second plurality of turbine blade rows configured to rotate in a second direction that is opposite the first direction, a turbine mid-frame assembly including a plurality of spokes, and a bearing coupled to the turbine mid-frame assembly and the inner rotor, wherein the spokes are adjustable to align the bearing in a radial direction.

In a further aspect, a gas turbine engine is provided. The gas turbine engine includes an inner rotor including a first plurality of turbine blade rows configured to rotate in a first direction, an outer rotor including a second plurality of turbine blade rows configured to rotate in a second direction that is opposite the first direction, a turbine mid-frame assembly including a plurality of spokes, and a bearing coupled to the turbine mid-frame assembly and the inner rotor, wherein the spokes are adjustable to align the bearing in a radial direction.

DETAILED DESCRIPTION OF THE INVENTION

Figure 1:
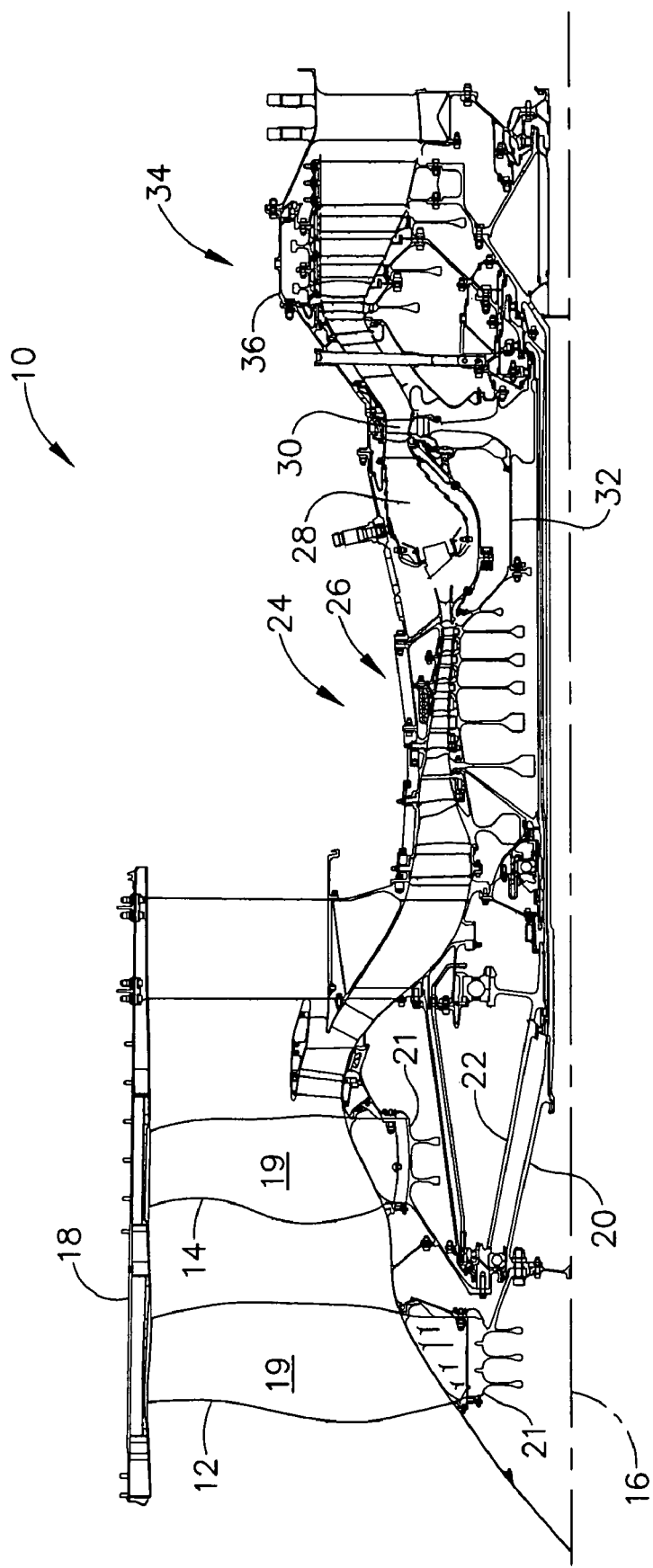
FIG. 1 is a cross-sectional view of a portion of an exemplary gas turbine engine.

FIG. 1 is a cross-sectional view of an exemplary gas turbine engine 10 that includes a forward fan assembly 12 and an aft fan assembly 14 disposed about a longitudinal centerline axis 16. The terms "forward fan" and "aft fan" are used herein to indicate that one of the fans 12 is coupled axially upstream from the other fan 14. In one embodiment, fan assemblies 12 and 14 are positioned at a forward end of gas turbine engine 10 as illustrated. In an alternative embodiment, fan assemblies 12 and 14 are positioned at an aft end of gas turbine engine 10. Fan assemblies 12 and 14 each include a plurality of rows of fan blades 19 positioned within a nacelle 18. Blades 19 are joined to respective rotor disks 21 that are rotatably coupled through a respective fan shaft 20 to forward fan assembly 12 and through a fan shaft 22 to aft fan assembly 14.

Gas turbine engine 10 also includes a core engine 24 that is downstream from fan assemblies 12 and 14. Core engine 24 includes a high-pressure compressor (HPC) 26, a combustor 28, and a high-pressure turbine (HPT) 30 that is coupled to HPC 26 via a core rotor or shaft 32. In operation, core engine 24 generates combustion gases that are channeled downstream to a counter-rotating low-pressure turbine 34 which extracts energy from the gases for powering fan assemblies 12 and 14 through their respective fan shafts 20 and 22.

Figure 2:
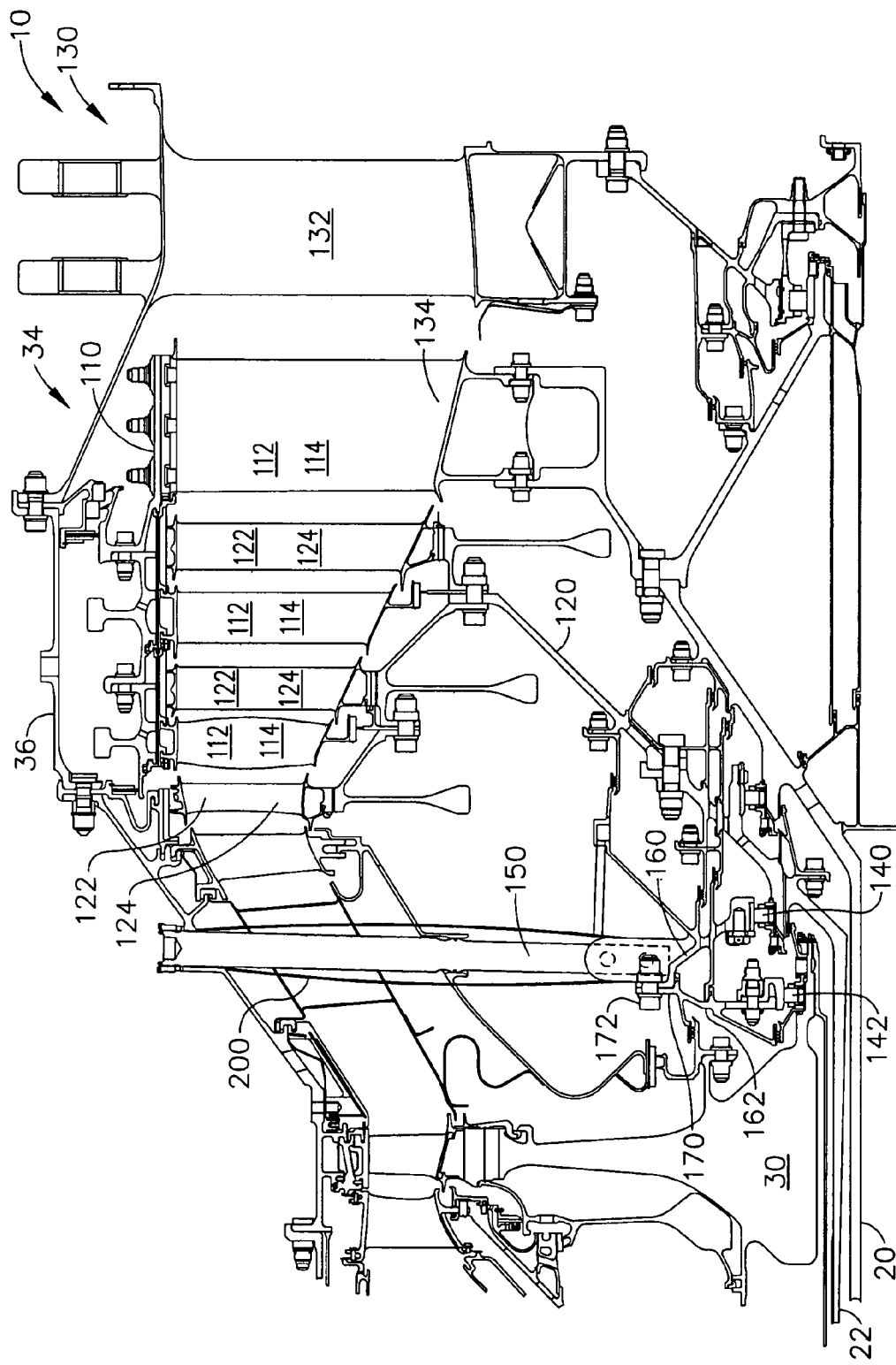
FIG. 2 is a cross-sectional view of a portion of gas turbine engine 10 shown in FIG. 1.
Figure 3:
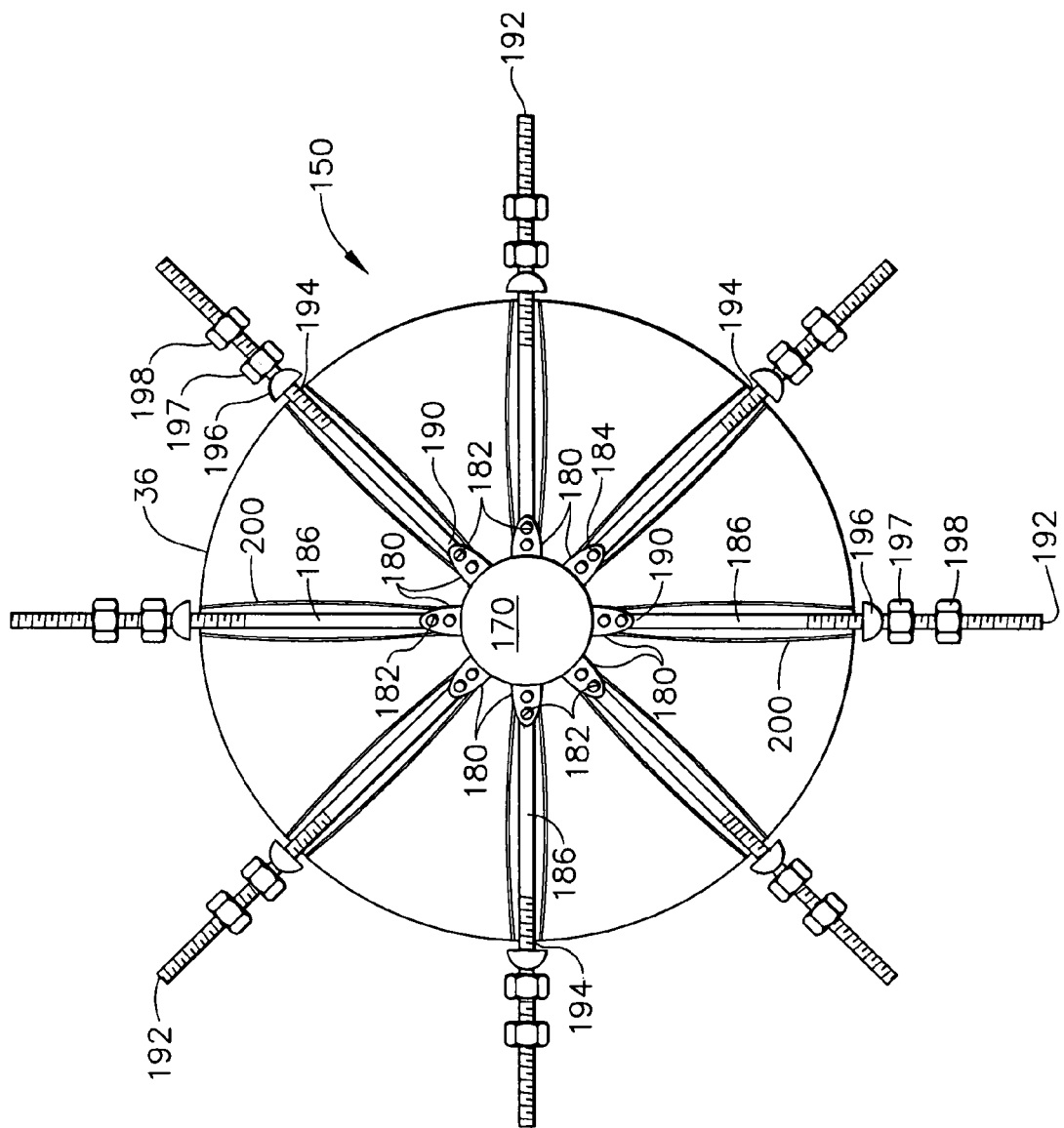
FIG. 3 is an end view of the gas turbine engine shown in FIG. 2.

FIG. 2 is a cross-sectional view of a portion of gas turbine engine 10 (shown in FIG. 1). FIG. 3 is an end view of gas turbine engine 10. In the exemplary embodiment, low-pressure turbine 34 includes a radially outer rotor 110 that is positioned radially inwardly of outer casing 36. Outer rotor 110 has a generally frusto-conical shape and includes a plurality of circumferentially-spaced rotor blades 112 that extend radially inwardly. Blades 112 are arranged in axially-spaced rows 114. Although, the exemplary embodiment illustrates three rows 114 of blades 112, it should be realized that outer rotor 110 may have any quantity of rows 114 of blades 112 without affecting the scope of the method and apparatus described herein. More specifically, outer rotor 110 includes M rows 114 of blades 112.

Low-pressure turbine 34 also includes a radially inner rotor 120 that is aligned substantially coaxially with respect to, and radially inward of, outer rotor 110. Inner rotor 120 includes a plurality of circumferentially-spaced rotor blades 122 that extend radially outwardly and are arranged in axially-spaced rows 124. Although, the exemplary embodiment illustrates only three rows 124 of blades 122, it should be realized that inner rotor 120 may have any quantity of rows 124 of blades 122 without affecting the scope of the method and apparatus described herein. More specifically, inner rotor 120 includes N rows 124 of blades 122. In the exemplary embodiment, M=N.

In the exemplary embodiment, inner rotor blades 122 within rows 124 are axially-interdigitated with outer rotor blades 112 within rows 114 such that inner rotor rows 124 extend between respective outer rotor rows 114. Blades 112 and 122 are therefore configured for counter-rotation of rotors 110 and 120.

In the exemplary embodiment, low-pressure turbine 34 also includes a rotor support assembly 130 that includes a stationary annular turbine rear-frame 132 that is aft of low-pressure turbine outer and inner blades 112 and 122. A rotatable aft frame 134 is positioned aft of outer and inner blades 112 and 122, and upstream from turbine rear-frame 132. Frame 134 is coupled to an aft end of outer rotor 110 for rotation therewith and to facilitate providing additional rigidity for supporting blades 112.

Shaft 22 is rotatably coupled between inner rotor 120 and fan 14 such that inner rotor 120 is rotatably coupled to fan 14. A first shaft bearing 140 is coupled to shaft 22 such that the weight of inner rotor 120 is distributed substantially equally about the circumference of gas turbine engine 10 via a spoked turbine mid-frame 150, and such that high-pressure turbine is rotatably coupled to turbine mid-frame 150 through a bearing 142. More specifically, gas turbine engine 10 includes a first housing 160 that is coupled to bearing 140 and a second housing 162 that is coupled to bearing 142. Bearing 140 is positioned between high-pressure turbine 30 and shaft 22. Housings 160 and 162 are coupled together to form a hub assembly 170. In the exemplary embodiment, housings 160 and 162 are coupled together using a mechanical fastener 172, such as a nut and bolt, for example. Accordingly, and in the exemplary embodiment, turbine mid-frame 150 facilitates supporting low-pressure turbine 34 and high-pressure turbine 30.

Turbine mid-frame 150 includes a plurality of yokes 180 that are coupled to hub 170. Although only eight yokes 180 are shown, it should be realized that turbine mid-frame 150 may have any quantity of yokes 180 without affecting the scope of the methods and/or apparatus described herein. Each yoke 180 is substantially y-shaped and includes at least one opening 182 formed therein. In the exemplary embodiment, each yoke 180 includes a pair of openings 182 that are each selectively sized to receive an expandable pin 184 therein. Pins 184 are used to couple a spoke 186 to each respective yoke 180. Accordingly, and in the exemplary embodiment, turbine mid-frame 150 includes eight spokes 186 that are each coupled to hub 170 using yokes 180 and pins 184. More specifically, each respective spoke 186 includes a first end 190 that is coupled to a respective yoke 180 using pins 184, and a second end 192 that extends through a respective opening 194 formed in outer casing 36. Accordingly, in the exemplary embodiment, outer casing 36 includes eight openings 194 that are each sized to receive a respective spoke 186. In the exemplary embodiment, each respective spoke second end 192 is threaded and selectively sized to receive a washer 196, a first mechanical fastener 197, and a second mechanical fastener 198. In the exemplary embodiment, washer 196 is at least one of a belleville or a wave-type washer that is substantially cone-shaped, mechanical fastener 197 is a spanner nut, and mechanical fastener 198 is a lock nut.

In the exemplary embodiment, during gas turbine engine 10 assembly, hub assembly 170 is coupled to spokes 186 using yokes 180 and pins 184. Each respective mechanical fastener 197 is coupled to a respective spoke 186 such that washer 196 is at least partially compressed against casing 36. More specifically, compressing each washer 196 against casing 36 induces tension into each respective spoke 186 to facilitate controlling the relative radial position of bearing 140. Each respective spoke 186 is then retained in position as each fastener 198 is tightened against each respective fastener 197 such that fastener 197 is held in a relatively constant position with respect to each respective spoke 186. In the exemplary embodiment, gas turbine engine 10 also includes a plurality of fairings 200. More specifically, each respective fairing 200 is positioned around each respective spoke 186, such that each fairing 200 facilitates channeling air around each respective spoke. 186.

During operation, radial forces generated during rotation of inner rotor 120 are transmitted to turbine mid-frame 150 via bearing 140. More, specifically, as inner rotor 120 rotates, because each respective spoke 186 is in tension, turbine mid-frame 150 facilitates maintaining bearing 140 in a relatively constant axial and radial position with respect to casing 36. Moreover, as a temperature of gas turbine engine 10 increases, washer 196 either expands or contracts to facilitate compensating for a thermal expansion of gas turbine engine 10. More specifically, and in the exemplary embodiment, washer 196 functions as a spring to facilitate maintaining bearing 140 in a relatively constant axial and radial position when engine 10 is either expanding or contracting due to thermal expansion.

Exemplary embodiments of a counter-rotating low-pressure turbines including an adjustable turbine mid-frame are described above in detail. The components are not limited to the specific embodiments described herein, but rather, components of each system may be utilized independently and separately from other components described herein. The adjustable turbine mid-frame described herein can also be used in combination with other known gas turbine engines.

While the invention has been described in terms of various specific embodiments, those skilled in the art will recognize that the invention can be practiced with modification within the spirit and scope of the claims.

What is claimed is:

1. A method for assembling a gas turbine engine, said method comprising:

provide a low-pressure turbine inner rotor that includes a first plurality of turbine blade rows configured to rotate in a first direction;

providing a low-pressure turbine outer rotor that includes a second plurality of turbine blade rows configured to rotate in a second direction that is opposite the first direction;

coupling a turbine mid-frame assembly including a plurality of spokes within the engine such that the spokes are spaced axially forward of the inner rotor;

coupling a plurality of yokes to a hub assembly such that the plurality yokes are coupled to the plurality of spokes using at least one expandable pin;

coupling a bearing between the turbine mid-frame assembly and the inner rotor such that the inner rotor is rotatably coupled to the turbine mid-frame; and adjusting the plurality of spokes to align the bearing in a radial direction.

2. A method in accordance with claim 1 further comprising:
coupling a first housing to the bearing;
coupling a second bearing to a high-pressure turbine;
coupling a second housing to the second bearing; and
coupling the first housing to the second housing to form the hub assembly.

3. A method in accordance with claim 1 wherein each spoke includes a first end and a second end, said method further comprises:
coupling each spoke first end to a respective yoke; and
coupling each spoke second end to an outer casing.

4. A method in accordance with claim 3 further comprising:
coupling at least one of a belleville washer and a wave-type washer to the second end;
coupling a mechanical fastener to the second end; and
adjusting the mechanical fastener to secure the spokes in a relatively fixed position.

5. A low-pressure turbine comprising:
an inner rotor comprising a first plurality of turbine blade rows configured to rotate in a first direction;
an outer rotor comprising a second plurality of turbine blade rows configured to rotate in a second direction that is opposite said first direction;
a turbine mid-frame assembly comprising a plurality of spokes, a hub assembly, at least one yoke coupled to said hub assembly;
a plurality of expandable pins configured to couple to each of said plurality of spokes to a respective yoke; and
a bearing coupled to said turbine mid-frame assembly and said inner rotor, said spokes are adjustable to align said bearing in a radial direction.

6. A low-pressure turbine in accordance with claim 5 wherein said hub assembly comprises:
a first housing coupled to said bearing;
a second bearing coupled to a high-pressure turbine; and
a second housing coupled to said second bearing.

7. A low-pressure turbine in accordance with claim 5 wherein each said spoke comprises:

a spoke first end coupled to said yoke; and
a spoke second end coupled to an outer casing.

8. A low-pressure turbine in accordance with claim 7 wherein said turbine mid-frame assembly further comprises:
at least one of a belleville washer and a wave-type washer coupled to said second end; and
a mechanical fastener coupled to said second end, said mechanical fastener configured to secure said spokes in a relatively fixed position.

9. A low-pressure turbine in accordance with claim 5 wherein said turbine mid-frame assembly comprises exactly eight spokes.

10. A low-pressure turbine in accordance with claim 5 further comprising a plurality of fairings, wherein each respective fairing at least partially circumscribes each respective spoke.

11. A gas turbine engine comprising:
an inner rotor comprising a first plurality of turbine blade rows configured to rotate in a first direction;
an outer rotor comprising a second plurality of turbine blade rows configured to rotate in a second direction that is opposite said first direction;
a turbine mid-frame assembly comprising a plurality of spokes, a hub assembly and at least one yoke coupled to said hub assembly;
a plurality of expandable pins configured to couple each of said plurality of spokes to a respective yoke; and
a bearing coupled to said turbine mid-frame assembly and said inner rotor, said spokes are adjustable to align said bearing in a radial direction.

12. A gas turbine engine in accordance with claim 11 wherein said hub assembly comprises:
a first housing coupled to said bearing;
a bearing rotatably coupled to a high-pressure turbine; and
a second housing coupled to said second bearing.

13. A gas turbine engine in accordance with claim 11 wherein each said spoke comprises:
a first end coupled to said yoke; and
a second end coupled to an outer casing;
a washer coupled to said second end;
a mechanical fastener coupled to said second end, said mechanical fastener configured to secure said spokes in a relatively fixed position; and
a plurality of fairings, wherein each respective fairing at least partially circumscribes each respective spoke.

14. A gas turbine engine in accordance with claim 11 wherein said turbine mid-frame assembly comprises exactly eight spokes.

* * * * *

UNITED STATES PATENT AND TRADEMARK OFFICE
CERTIFICATE OF CORRECTION

| | |
|---|---|
| PATENT NO. | : 7,195,447 B2 |
| APPLICATION NO. | : 10/976495 |
| DATED | : March 27, 2007 |
| INVENTOR(S) | : Moniz et al. |

It is certified that error appears in the above-identified patent and that said Letters Patent is hereby corrected as shown below:

Column 5, line 5, between "plurality" and "yokes" insert -- of --.

Signed and Sealed this

Second Day of October, 2007

JON W. DUDAS
*Director of the United States Patent and Trademark Office*